United States Patent [19]
Ward

[11] 4,196,164
[45] Apr. 1, 1980

[54] MANUFACTURE OF PLASTICS MATERIAL ARTICLES

[75] Inventor: Peter Ward, Leeds, England

[73] Assignee: Plastona (John Waddington) Ltd., Leeds, England

[21] Appl. No.: 7,839

[22] Filed: Jan. 30, 1979

Related U.S. Application Data

[60] Continuation-in-part of Ser. No. 793,692, May 4, 1977, abandoned, which is a division of Ser. No. 619,541, Oct. 3, 1975, abandoned.

[30] Foreign Application Priority Data

Oct. 4, 1974 [GB] United Kingdom ............... 43080/74

[51] Int. Cl.² ........................ B29C 17/03; B29D 7/24; B29F 5/00
[52] U.S. Cl. .................................... 264/322; 264/544; 264/553; 264/554; 264/555; 264/292; 264/280; 264/290.2
[58] Field of Search ............... 264/292, 322, 544, 294, 264/296, 289, 138, 553, 554, 555, 297

[56] References Cited

U.S. PATENT DOCUMENTS

| | | | |
|---|---|---|---|
| 2,490,781 | 12/1949 | Cloud | 53/453 |
| 2,728,941 | 1/1956 | Alles et al. | 264/289 |
| 2,851,733 | 9/1958 | Pangonis et al. | 264/289 |
| 3,014,234 | 12/1961 | Koppehele | 264/289 |
| 3,046,599 | 7/1962 | Nicholas et al. | 264/289 |
| 3,055,048 | 9/1962 | Koppehele | 264/289 |
| 3,217,073 | 11/1965 | Olson et al. | 264/289 |
| 3,231,561 | 5/1967 | Brown | 264/322 |
| 3,238,565 | 3/1966 | Jacobs | 264/321 |

*Primary Examiner*—W. E. Hoag
*Attorney, Agent, or Firm*—Fred Philpitt

[57] ABSTRACT

This invention pertains to a method for thermoforming thin-walled plastics articles from an elongated polyolefin web which is manufactured so as to have minimum orientation so that it will expand lengthwise and widthwise when passed through a heating zone prior to thermoforming, which method comprises moving the web both laterally and longitudinally in a co-ordinated manner whereby the normal inclination of the web to sag because of the longitudinal and lateral expansion of the web due to heating is effectively eliminated.

3 Claims, 4 Drawing Figures

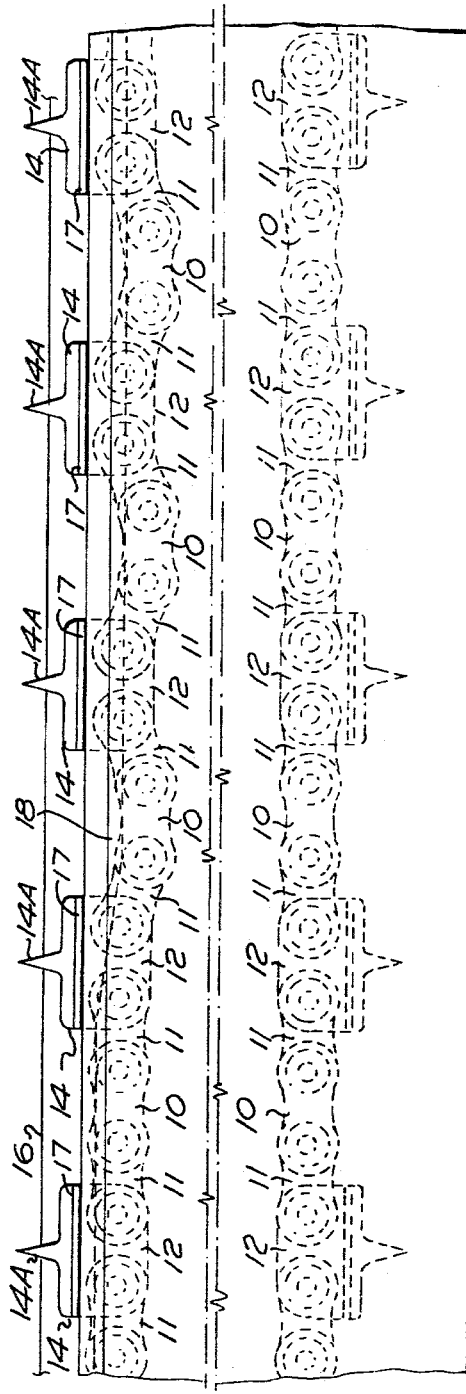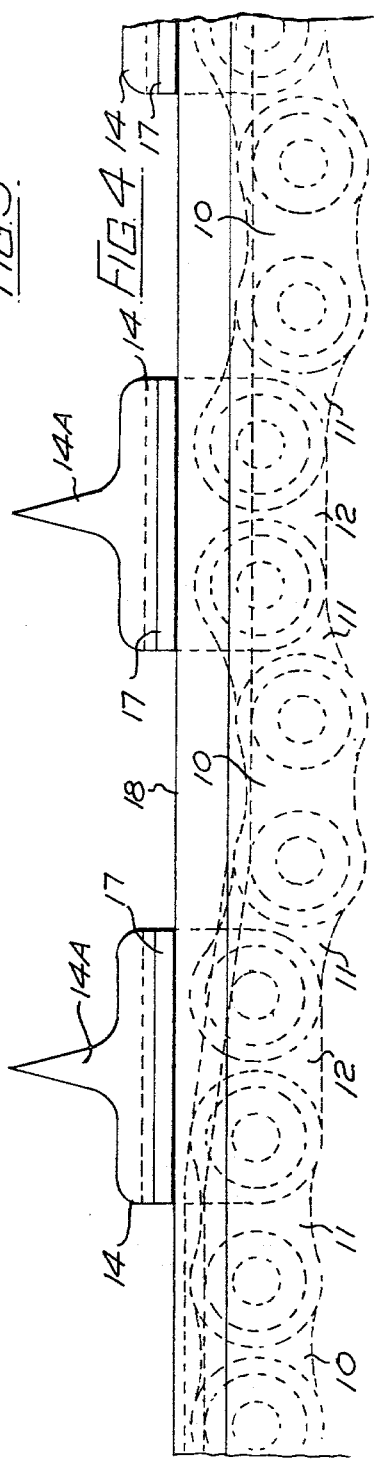

MANUFACTURE OF PLASTICS MATERIAL ARTICLES

RELATED APPLICATIONS

This is a continuation-in-part of my prior application Ser. No. 793,692, filed May 4, 1977 now abandoned which is a division of my prior application Ser. No. 619,541 filed Oct. 3, 1975 now abandoned.

BACKGROUND

A very wide variety of rigid, thin walled plastics material products produced by thermoforming sheet material are now in every day use throughout the world. Such articles include cups, plates, tubs and lids, and perhaps the most commonly used plastics materials for these products are polystyrene and polyvinylchloride, although polyvinylchloride has attracted criticism from a health point of view in recent years.

Conventionally plastics sheet material is thermoformed by feeding the sheet from roll stock, holding the side edges by suitable chains, feeding the sheet past a heating station where the sheet is heated, usually by overhead radiant heaters, and the heated sheet passes directly to a thermoforming machine which forms the desired articles.

Any suitable thermoforming technique such as vacuum forming, pressure forming, plug assist or mechanical forming or any combination of such techniques may be used in the forming of the articles, but in all cases the sheet material is heated to effect a degree of softening of the material so that it can be thermoformed. The forming of the articles will be referred to hereinafter and in the claims simply and generally as "theremoforming".

Heretofore, it has been difficulty to thermoform high quality rigid products from polyolefin sheet such as polypropylene or polyethylene (or copolymers thereof) sheet material. There are a number of reasons for this difficulty. One reason is that polypropylene sheets to be thermoformed unless they should have been biaxially orientated, expand under thermal action.

Orientation is usually imparted to a plastics material web by stretching it in the direction in which it is desired that the web should be orientated and if the web is to be biaxially orientated it is stretched in two directions at right angles to one another. A plastics material web which is orientated in effect has frozen in stresses which are released when the web subsequently is heated and an orientated plastics material web normally will shrink when heated. There are many cases where it is desireable to have orientation in a plastics material web, for example when the web is to be used for shrink wrapping, but in the field of thermoforming of rigid articles from plastics material webs, the step of orientating a plastics material web, which is usually extruded or calendered, is considered to be undesirable as special expensive orientating machinery is required, the process of orientating represents an increase in cycle time, and more manual labour is required for maintaining the orientating equipment.

It is normal therefore for thermoformers to thermoform plastics material webs which, apart from some residual orientation which occurs during extrusion but is not more than 5%, have not been separately orientated.

A web which has not been specifically orientated may not be easy to thermoform unless it behaves satisfactorily when being processed. Up to the present time, mainly polystyrene and polyvinylchloride have been used for thermoforming because extruded webs of these materials, of thickness suitable for producing thermoformed articles, not provided specifically with any orientation by separate orientation machinery in fact shrink when heated, P.V.C. by 5% and polystyrene by 11%. This means that these sheets become taught when held by feed chains under thermoforming machine heaters and remain taught when presented to the machine moulds, which makes for the production of satisfactory products.

If one however uses an extruded polyolefin sheet which is of suitable thickness for producing thermoformed articles and which has not been subjected to orientation, one finds that it expands under the action of heat and it sags when heated in the thermoforming machine. Furthermore, the polyolefins, particularly polypropylene have a narrow, critical thermoforming temperature range (of the order of 10%) and if any part of the sheet is above that range it will melt, and if it is below that range it will be rigid, and in either case it will not thermoforming satisfactorily. The handling and heating of polyolefin sheet material which is extruded and not separately orientated is extremely exact if satisfactory thermoformed articles are to be obtained therefrom.

If conventional methods are used for thermoforming extruded or calendered polyolefin sheet material, in particular polypropylene sheet which has not been separately orientated, the sheet, due to thermoexpansion when heated at the heating stage, sags between the feed chains and the sagging portion therefore lies further from the heaters than the edge regions of the sheet which are held by the chains, and there is differential heating of different parts of the sheet because, when radiant heaters are used, the heat which falls on a surface from a radian heater is proportional to the square of the distance from the heater to the surface. Because polypropylene has such a small temperature range over which it proceeds from a rigid sheet to an unworkable molten mass, it is virtually impossible to satisfactorily heat polypropylene sheet for thermoforming of same by conventional heating methods without creating hot and cold spots on the sheet, and the regions of such hot and cold spots do not thermoform satisfactorily.

Additionally, if a sagging sheet is fed to a thermoforming machine, the results are unsatisfactory from a production point of view. A sagging sheet in thermoforming machine usually means that too much sheet material is presented to the mould cavities, and the resulting products have ridges or tears which make them unsatisfactory.

It has already been proposed to provide a method of thermoforming articles from polyolefin sheet material wherein a web of plastics material is held by means of chains which diverge mutually while holding the sheet material, in order to compensate for widthwise expansion of the sheet material. There is no evidence known to the applicant to show that this machine has been effective in use, but the applicant's view is that in this prior arrangement, the polyolefin sheet when produced, for example, by extruding, is stretched lengthwise and becomes stretched lengthwise and becomes orientated lengthwise. In the subsequent heating prior to thermoforming, the frozen-in stresses lengthwise of the sheet and due to orientation are released, tending to shrink the material lengthwise, but these are compensated for by the lengthwise thermal expansion which takes place as a result of heating, and therefore in the prior proposal there is no indication of any need for lengthwise compensation. Unless the lengthwise expansion equals the lengthwise shrinking exactly, a condition which is very difficult to achieve as the sheets may vary in thickness widthwise and lengthwise, then there will be a net expansion or shrinkage which will lead to unsatisfactory finished products.

The present invention seeks to provide a method of manufacturing rigid, thin walled plastics material articles from a web of polyolefin plastics sheet material which is suitable for thermoforming and which has little or no orientation so that it expands lengthwise and widthwise when heated.

According to the invention there is provided a method of manufacturing thin walled plastic material articles from polyolefin plastics web which is substantially free of orientation so that it will expand lengthwise and widthwise when heated to thermoforming temperature comprising holding the web along its edges on spaced holding means carried by chains which move in endless paths, carrying said web along portions of said paths, heating the web to thermoforming temperature whilst it moves along said portions of the endless paths, and thermoforming the heated sheet material to form articles therein, the improvement that the aid holding means of each chain are moved further apart lengthwise of said portions of each endless path as they move along said portions of said endless paths to compensate for lengthwise expansion of the web and the holding means of the respective chains are moved apart as they move along said portions of the endless path to compensate for widthwise expansion of the web so that web is supported without sagging and without being stretched by the moving holding means.

An embodiment of the present invention will now be described by way of example, with reference to the accompanying drawings, wherein:

FIG. 3 is an enlarged side view of part of the chain section shown in FIG. 2; and FIG. 4 is a still further enlarged view of part of the chain section shown in FIG. 2, this view being slightly distorted in order to illustrate the principle of operation of the invention.

Figure 1:
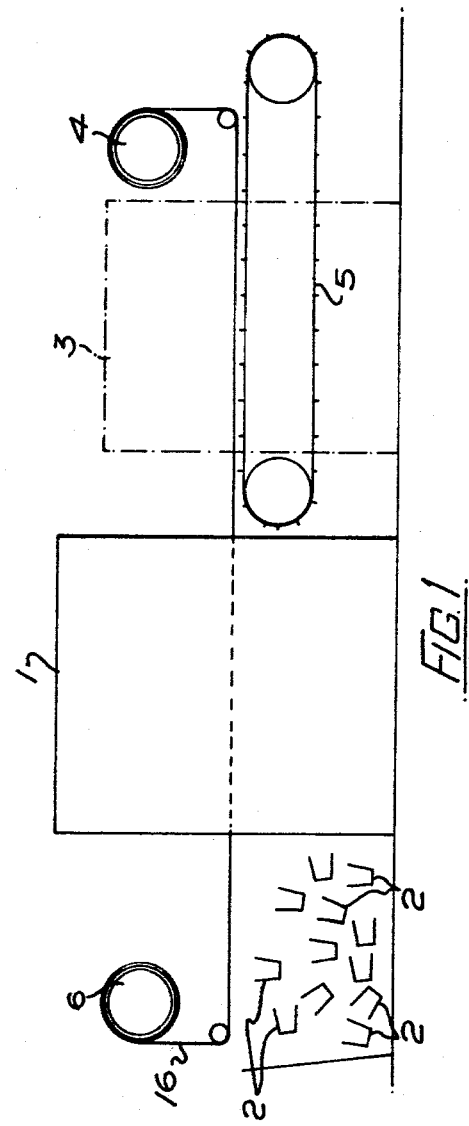
FIG. 1 is a diagrammatic side view of a thermoforming plant embodying the principles of the present invention.

Referring firstly to FIG. 1, a conventional thermoforming machine is represented by numeral 1, in which articles 2 are formed from a heated web 16 of thermoformable plastics material. The heating of the web 16 takes place in a heating chamber 3 immediately preceding the machine 1. The web 16 is carried through the heating chamber 3 by endless chains 5, and receives the web from a roll 4 of plastics material stack. The web is of polyolefin material, of suitable thickness for thermoforming and produced so that it has little or no orientation in either direction so that in fact it expands widthwise and lengthwise when heated. The remainder of the web 16, after formation and removal of articles 2 is wound as at 6 on a take up roll.

Figure 2:
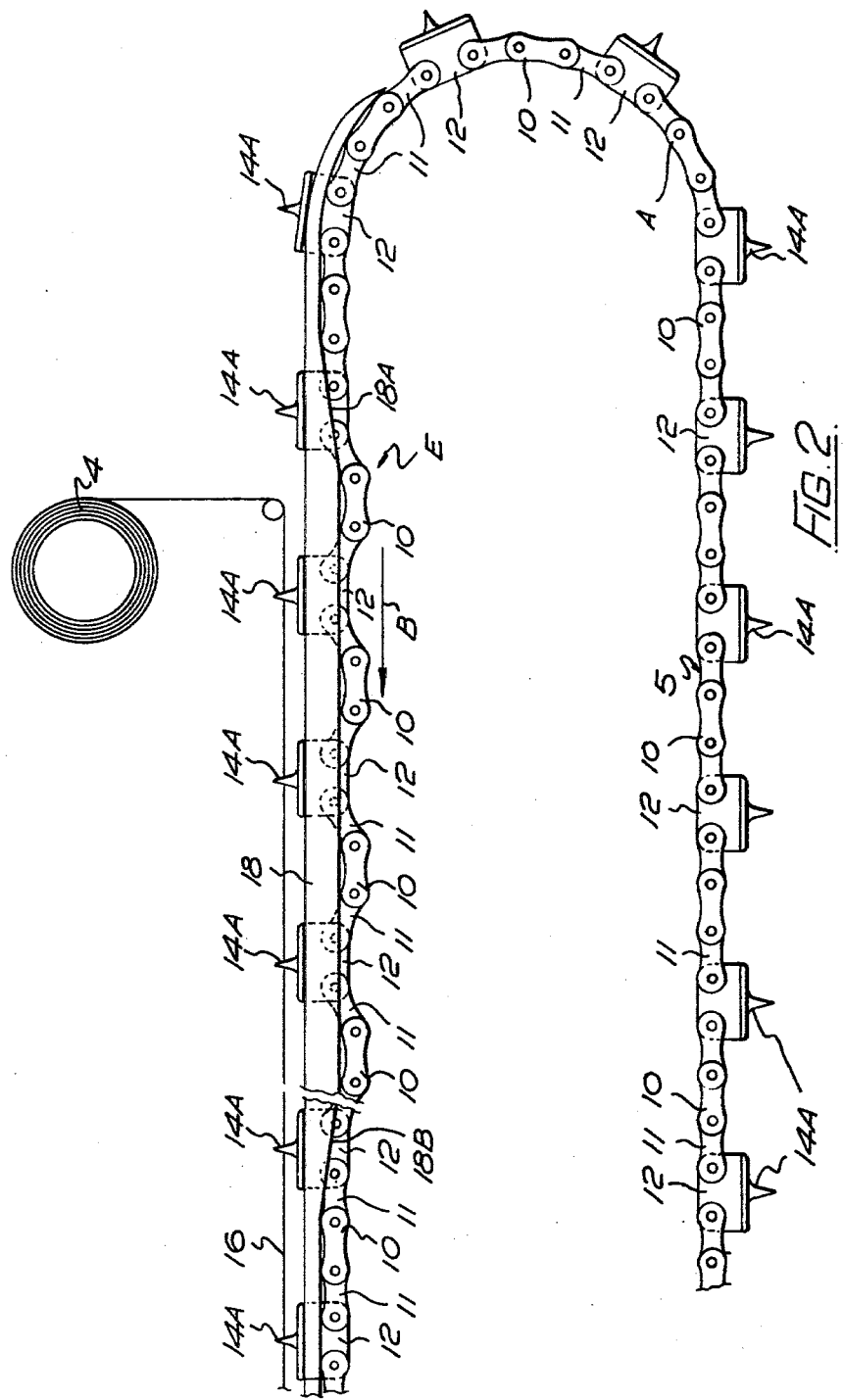
FIG. 2 is a diagrammatic side elevation of part of an endless chain for carrying a plastics web of the type aforesaid.

Referring now to the other fitures, and firstly to FIG. 2, in this figure is shown a portion of one of the endless chains 5 which travels on the path marked A in the figure. In the apparatus there are two such endless chains symmetrically arranged about a central, vertical plane lying parallel to the plane of the paper on which FIG. 1 appears, the chains being located in upright planes which intersect the plane of the web carried by the chains at a right angle. Therefore, one complete chain is omitted from the drawings, but its construction and operation are identical with the arrangement now to be described.

It will be noticed that from the right hand portion of FIG. 2, that the chain travels in a semicircular path as it passes round an appropriate guide sprocket as shown in FIG. 1, it then travels in a generally horizontal direction as indicated by arrow B in FIG. 2. The chain is made up of pivotably connected links 10 and 12 as best seen in FIG. 4, the links 10 alternating with the links 12, and being pivotably interconnected by connecting links 11 again best shown in FIG. 4. The links 12 are provided with brackets 14, having outwardly projecting spikes 14A for carrying the web 16 of synthetic plastics material to be heated. This web of plastics material best shown at 16 in FIGS. 1 and 2 and is drawn from the spool 4 shown in FIGS. 1 and 2 appropriately positioned in relation to the horizontally travelling portions of the chains 5. The brackets 14 have ledges 17 which run on the top horizontal surface of a track guide 18 lying in the direction of the horizontal path of movement (indicated by arrow B in FIG. 2) of the web 16.

The utilisation of this chain 5 is to collect an edge of the web 16 (the other chain serving simultaneously to collect the other edge of the web whilst adjacent brackets 14 are spaced closer together than they are by the time these brackets reach the end of the horizontal path B, so that longitudinal extension of the web due to heating thereof can be compensated for by progressive displacement of adjacent brackets 14 but without stretching the web, and the web can be prevented from sagging. This is achieved by providing cam track to the underside of the rail 18 which in effect forms a "kink" or "tuck" in the chain by downwardly displacing only the links 10 as they pass station E of the guide rail, and by progressively allowing the lengths 10 to move upwards as they travel along the horizontal path B. To this end, the underside of guide rail 18 has a downwardly inclined cam portion 18A and a gradually upward inclined guide portion 18B, located at opposite sides of station E as shown in FIG. 2.

The motion of the links 10 and 12 will be clearly understood from the drawings, and FIG. 4 shows in enlarged form how the links 11 pivot as they pass station E, causing adjacent brackets 14 to move closer together. The web 16 is then impaled on the spikes 14A, and as the chain is pulled or driven in the direction of arrow B, the displaced links 10 are locked against the underside of cam surface 18B, and as they move along this cam surface in the direction of arrow B, they progressively move back into alignment with links 12, and the angular displacement of links 11 gradually reduce to zero. This has the effect of progressively increasing the spacing between brackets 14, and thereby increasing the pitching between adjacent spikes 14A as the chain moves in the direction of arrow B.

The extent of the initial tuck as dictated by the cam surface 18A will depend upon the thermal extension of the web consistant with the length of travel of the chains, which takes place in the direction of arrow B, to ensure full and adequate heating of the plastics material sheet without sag.

The symmetrically arranged chains will pass through a suitable heating chamber in which the web is heated, for example by a fluid in the form of gas and/or vapour. Alternatively or additionally, the heating may be by infra-red heaters. From the heating chamber, the hot web is passed directly to a thermoforming machine, or can be heated further by additional means before being passed to the thermoforming machine. In any event, the final articles are produced in the web in the thermoforming machine.

In FIG. 4, the links 11 are shown as being moved from a position of maximum angular displacement to zero angular displacement relative to the links 10 and 12 over a relatively short distance. This is for the purposes of explanation and in practice, the distance over which the links change in angularity from maximum to zero, would be much greater.

It will be appreciated that the apparatus provides a simple and effective method of compensating for lengthwise extension of a polyolefin web which is substantially free of orientation in both directions so that it expands when heated. Furthermore, the two chains making up the apparatus are mutually divergent in the direction of arrow B in order to compensate for the lateral expansion of the web which will also take place as a result of heating.

Such lengthwise and widthwise compensation is for taking up expansion to such an extent that the web will not sag or be stretched.

The driving sprocket for each chain is at the left hand end of the apparatus as shown in FIG. 1, and a tension sprocket is applied to the other end of the chain so as to maintain the ledges 17 held firmly against the top surface of guide 18, and the links firmly against the cam surfaces of the guide 18.

In actual fact, the links 10 are provided with extension rods forming cam followers extending outwardly from the chain and these rods have rollers which engage cam surfaces 18A and 18B. The ledges 17 may engage a horizontal surface which is not integral with or part of the guide 18, but the guide 18 has been shown in the example given as defining the surface negaged by ledges 17 and also the surfaces engaged by links 10 for simplicity of description.

I claim:

1. In a method of manufacturing thin walled plastic material articles from polyolefin plastics web which is substantially free of orientation so that it will expand lengthwise and widthwise when heated to thermoforming temperature comprising holding the web along its edges on spaced holding means carried by chains which move in endless paths, carrying said web along portions of said endless paths, heating the web to thermoforming temperature whilst it moves along said portions of the endless paths, and thermoforming the heated sheet material to form articles therein, the improvement that the said holding means of each chain are moved further apart lengthwise of said portions of each endless path as they move along said portions of said endless paths to compensate for lengthwise expansion of the web and the holding means of the respective chains are moved apart as they move along said portions of the endless path to compensate for width-wise expansion of the web so that web is supported without sagging and without being stretched by the moving holding means.

2. A method according to claim 1 wherein the holding means comprise spikes which are moved upwardly so that the web becomes impaled thereon, and are moved downwardly to remove the web from the spikes.

3. In the known method of manufacturing thin-walled plastics material articles from an elongated polyolefin plastic web which is substantially free of orientation so that it will expand lengthwise and widthwise when heated to thermoforming temperature, which method comprises holding the plastics material web adjacent its opposed lateral edges, moving said web through a heating zone so as to soften the web to thermoforming temperature, and thermoforming the thus heated web at a thremoforming zone to form thin walled plastics material articles therefrom, the improvement which comprises:

(a) moving the lateral edges of said plastics material web laterally with respect to each other and with respect to the longitudinal axis of said web after heating same and as said plastics material web moves towards said thermoforming zone;

(b) moving the plastics material web in a longitudinal direction at a faster rate near the outlet of said heating zone than at the inlet of said heating zone, whereby the normal inclination of the plastic web to sag because of the longitudinal and lateral expansion of the web due to heating in the heating zone is effectively eliminated by the simultaneous movements set forth in (a) and (b).

* * * * *